United States Patent [19]

Parulski

[11] Patent Number: 5,138,454
[45] Date of Patent: Aug. 11, 1992

[54] MEGAPIXEL VIDEO PREVIEWER FRAMESTORE AND DISPLAY

[75] Inventor: Kenneth A. Parulski, Rochester, N.Y.

[73] Assignee: Eastman Kodak Company, Rochester, N.Y.

[21] Appl. No.: 760,302

[22] Filed: Sep. 16, 1991

[51] Int. Cl.$^5$ ............................................... H04N 7/00
[52] U.S. Cl. ..................................... 358/180; 358/140
[58] Field of Search ............... 358/400, 180, 140, 209,
358/909, 213.26, 444, 451, 453; 375/107;
369/178

[56] References Cited

U.S. PATENT DOCUMENTS

| | | | |
|---|---|---|---|
| 4,002,824 | 1/1977 | Petrocelli | 358/180 |
| 4,891,702 | 1/1990 | Nakayama et al. | 358/140 |
| 4,930,014 | 5/1990 | Maeda et al. | 358/209 |
| 4,951,125 | 8/1990 | Kojima et al. | 358/180 |
| 4,963,981 | 10/1990 | Todaka et al. | 358/180 |
| 4,991,020 | 2/1991 | Zwirn | 358/180 |
| 5,025,315 | 6/1991 | Johary et al. | 358/180 |
| 5,029,006 | 7/1991 | Katsumata et al. | 358/180 |

*Primary Examiner*—Stephen Brinich
*Attorney, Agent, or Firm*—Edward Dugas

[57] ABSTRACT

A digitized image previewer framestore apparatus enables a photofinisher to rapidly view what is seen by a high resolution CCD image sensor (but at a lower resolution) on a preview display. A selected portion or selected portions of the imagery data derived by way of the array of pixel elements of the high resolution sensor are controllably coupled to a pair of 'ping-pong' write-/read memories. The image resolution or storage capacity of each of memory is less than that of the high resolution CCD sensor and is considerably less than that of the 3072×2048 resolution of a high resolution color output image to be stored on compact disc. Depending upon the selected portion of the image incident on the CCD sensor is to be viewed, respective pixel and line rate clocks for the CCD sensor are subsampled and coupled to address generating counters used to access the ping-pong memories. As a result, only those CCD pixels for which (subsampled) clock signals have been generated will be displayed. By 'ping-ponging' write-in and read-out of the memory pair, a first low resolution image may be written into one of the memories, while a second low resolution image is being rapidly read out and displayed. Then, at the end of the write-in frame interval, the contents of the newly loaded memory are rapidly read out to the preview display, while the next selected low resolution portion of the sensor image is being written into the memory the contents of which were previously read out and displayed.

26 Claims, 7 Drawing Sheets

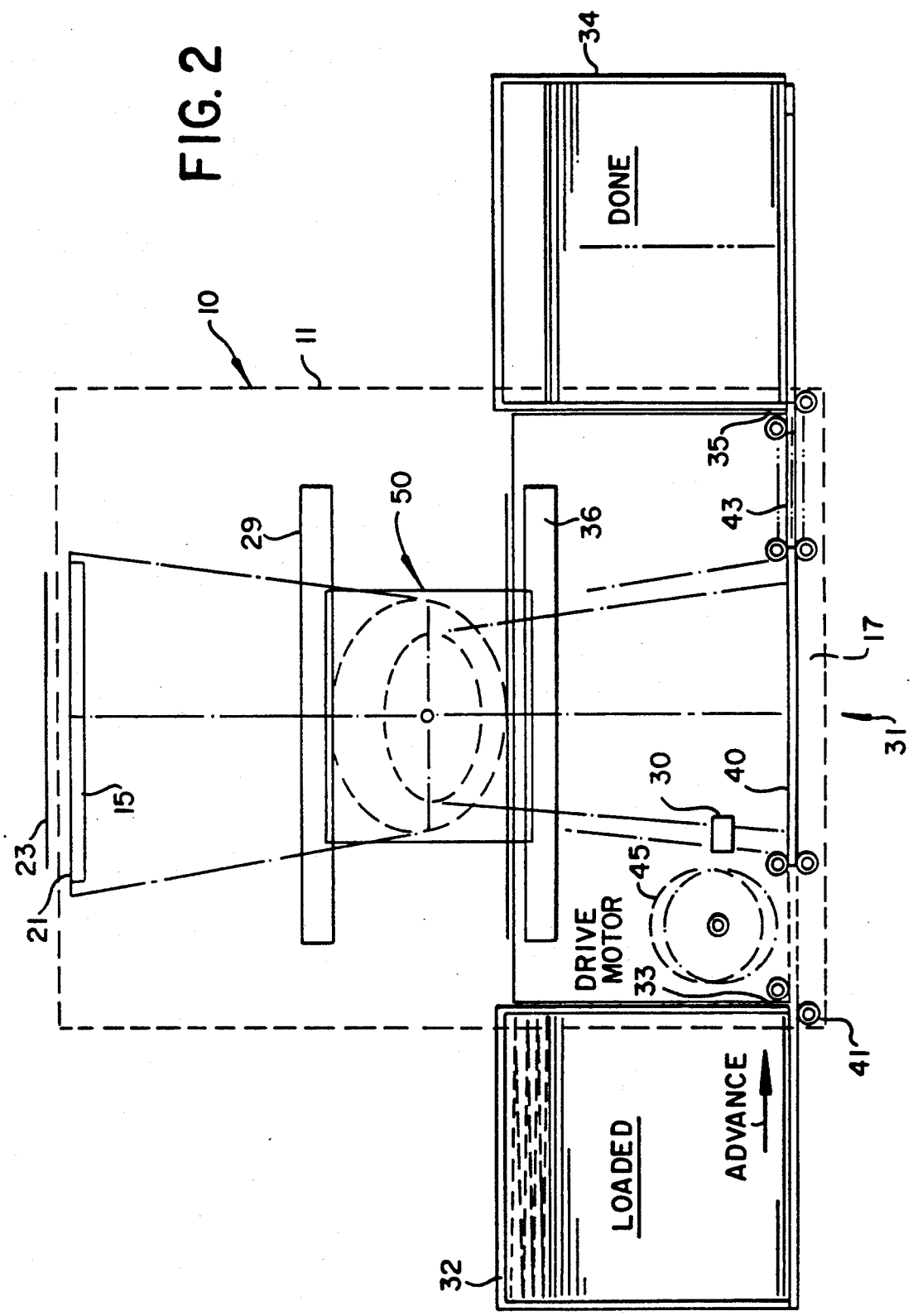

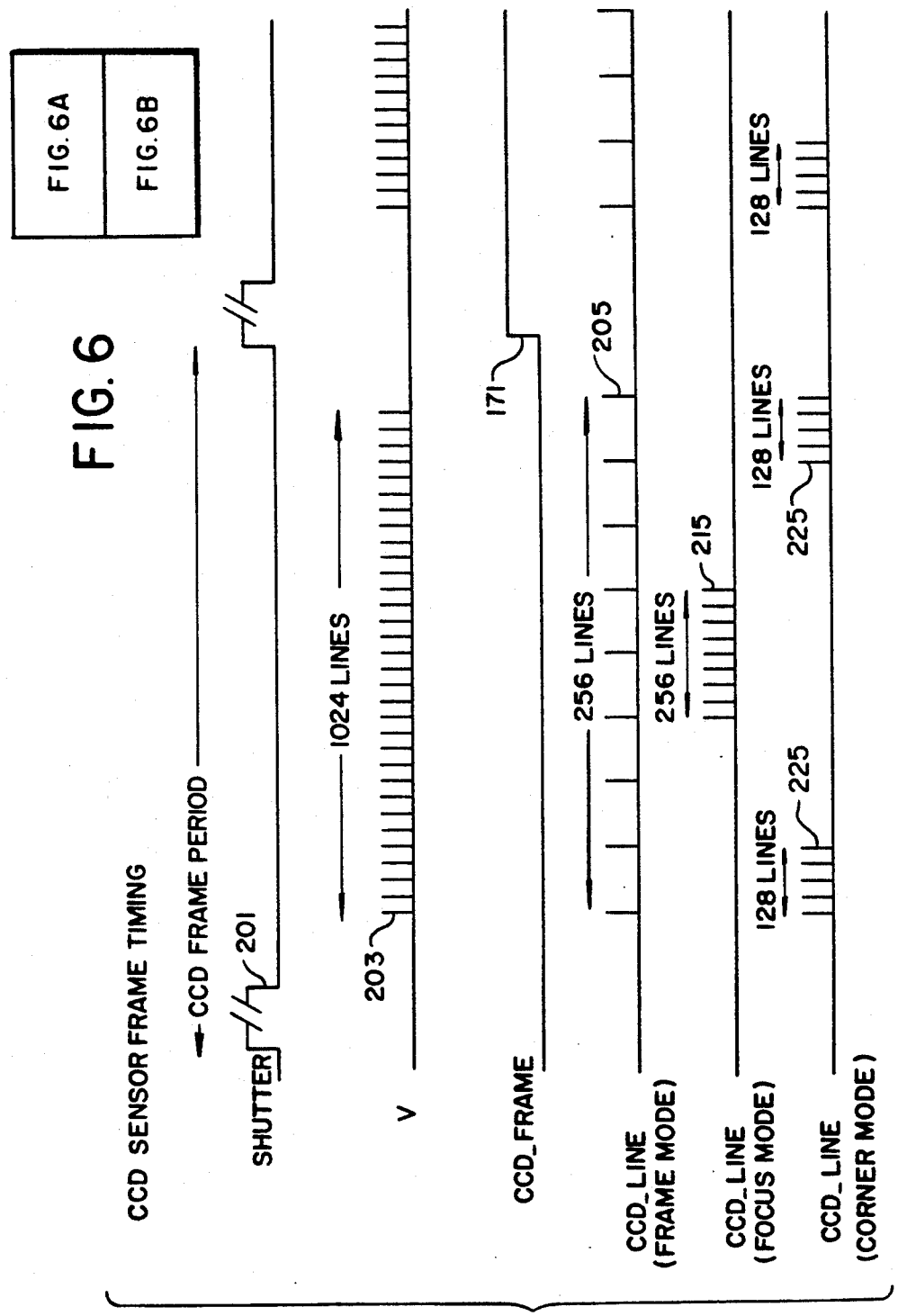

FIG.7
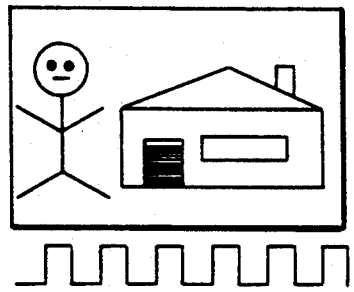
PIXEL CLOCK
(EVERY 4TH PIXEL)
LINE CLOCK
(EVERY LINE)
FRAMING MODE
(4:1 SUBSAMPLING)
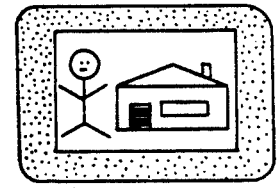
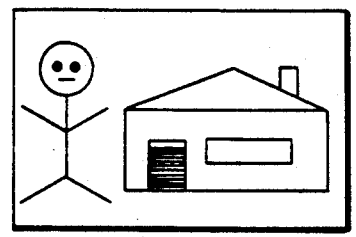
PIXEL CLOCK
(EVERY PIXEL)
LINE CLOCK
(EVERY LINE)
FOCUSING MODE
(CENTER IMAGE)
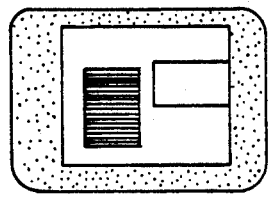
FIG.8
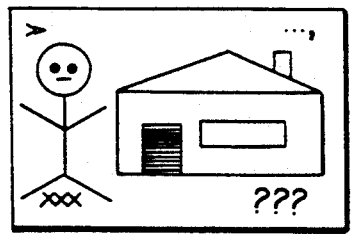
PIXEL CLOCK
(EVERY PIXEL)
LINE CLOCK
(EVERY LINE)
SENSOR ALIGNMENT
(4 CORNERS)
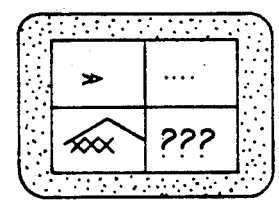
FIG.9
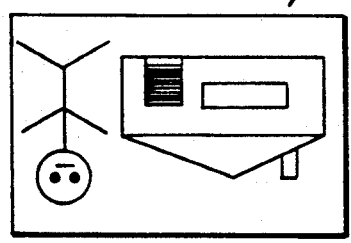
COUNTDOWN
ON READOUT
MIRROR
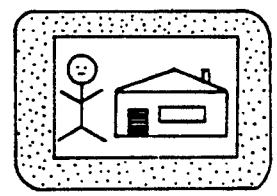
FIG.10

MEGAPIXEL VIDEO PREVIEWER FRAMESTORE AND DISPLAY

FIELD OF THE INVENTION

The present invention relates to a high resolution color photoprint digitizing scanner, projection and focussing parameters of which are adjustable by viewing a low resolution, monochromatic 'preview' display unit, and is particularly directed to a framestore write/read control mechanism which facilitates storage and readout of a selected low resolution portion of an image incident upon the scanner's high resolution image sensor, so that the selected image portion may be rapidly coupled to the preview display unit.

BACKGROUND OF THE INVENTION

Co-pending Patent application Ser. No. 07/760,438, filed Sep. 16, 1991, entitled "Print Scanner with Soft Key Variable Magnification," by K. A. Parulski et al, assigned to the assignee of the present application and the disclosure of which is herein incorporated, described a zoom/focus lens control mechanism for a high resolution color digitizing scanner, which enables the workload of the photofinisher, in particular the need for the photofinisher to perform a zoom lens adjustment for each photoprint of a given batch of photoprints to be scanned and digitized, to be substantially reduced.

Pursuant to the invention described in that application, by means of a set of frame, focus, program and capture control software routines, the magnification and focus default settings of the projection system's zoom lens may be readily recalibrated to new values associated with magnification and focus adjustments of the zoom lens, so as to allow the photofinisher to easily optimize the presentation of the photoprint image on a preview display monitor to which the output of the scanner's image sensor is coupled. After calibration, as additional photoprints of the same size of a batch are processed, the currently programmed default settings are used, without the need for adjustment, so that each photoprint will be properly imaged on the scanner's high resolution photosensor (e.g. a 1536×1024 pixel array yielding an approximately 1.6 Megapixel full frame count).

Such a lens control mechanism is especially useful in a photoprint scanner with is capable of automatically scanning a series of platen-mounted photoprints, the platens for which contain machine readable photoprint parameter information (e.g. bar codes or adjustable indicator elements), as described in co-pending U.S. patent application Ser. No. 07/760,437, filed Sep. 16, 1991, entitled "Photoprint Retaining Platen For Digitizing Image Scanner", by K. A. Parulski et al, assigned to the assignee of the present application and the disclosure of which is herein incorporated.

The photoprint scanner itself may be of the type described in co-pending U.S. patent application Ser. No. 07/762,323, filed Sep. 16, 1991, by K. A. Parulski et al, entitled "Dual Imaging Station Scanner", assigned to the assignee of the present application and the disclosure of which is also herein incorporated. Using the platen-mounted photoprint feature, this dual imaging station scanner is able to automatically digitize respective images contained on a plurality of sequentially fed, platen- mounted photoprints. The photoprints themselves may have been brought by the customer to the photofinisher in a loosely arrayed pile or mounted in a photo-album binder. The photoprint-mounting platens and platen feed station of the scanner allow a photofinisher to rapidly process any number of pictures provided by the customer, irrespective of the condition or form in which the photoprints are supplied. The machine-readable parameter information is detected by one or more image parameter sensors located in the platen feed path and is used to adjust the magnification and focus default settings of the scanner's image projection system, including zoom and focussing ring positions of the zoom lens, so as to facilitate the automatic processing of a plurality of photoprints of a common batch.

Within the photoprint image projection path of the scanner is an image projection device containing a variable magnification device in the form of an adjustable focus, zoom lens. The projection path is incident upon a photo-responsive device, such as a high resolution CCD sensor, image output signals from which are digitized for storage on a compact disc. Control of the operation of the scanner includes the use of the above-reference 'preview' display device to which output signals provided by the photosensor are coupled so as to display a low resolution version of the image incident upon the high resolution CCD sensor to the photofinisher.

More particularly, in order to enable the photofinisher to optimally adjust the projection and focussing parameters of the scanner, such as any required adjustment of the zoom lens, a selected portion of the output of the high resolution (1536×1024 pixel) CCD image sensor is coupled separately of the high resolution image processing workstation to an auxiliary, lower resolution, monochromatic 'preview' display unit, such as a 384×256 pixel array display unit. While it would be possible to use the high resolution color display terminal of the photofinishing workstation for this purpose, from a practical operational standpoint, the processing time it requires to display a full 6 Megapixel color frame (making use of an optical translation mechanism which effectively doubles the horizontal and vertical resolutions of the CCD sensor) is prohibitive. For successful operation of the scanner, what is necessary is that, prior to image capture, the photoprint be correctly positioned, and its image correctly sized and focussed on the image sensor. To satisfy these requirements, when 'previewing' the image, the photofinisher does not need to view a full color image at its highest resolution; the job can be done quickly using a lower resolution, monochromatic display.

SUMMARY OF THE INVENTION

In accordance with the present invention, to enable the photofinisher to rapidly view what is seen by the high resolution CCD image sensor (but at a lower resolution) on the preview display, a selected portion or selected portions of the imagery data derived by way of the array of pixel elements of the high resolution sensor are controllably coupled to an auxiliary preview framestore apparatus which includes a pair of 'ping-pong' write/read memories. The image resolution or storage capacity of each of memory is less than that of the high resolution 1.6 Megapixel CCD sensor and is considerably less than that of the 3072×2048 pixel high resolution color output image to be stored on disc. Depending upon which selected portion of the image incident on the CCD sensor is to be viewed, respective pixel and line rate clocks for the CCD sensor are subsampled and coupled to address generating counters used to access the ping-pong memories. As a result, only those CCD pixels for which (subsampled) clock signals have been generated will be displayed.

By 'ping-ponging' write-in and read-out of the memory pair, a first low resolution image may be written into one of the memories, while a second low resolution image is being rapidly read out and displayed. Then, at then end of the write-in frame interval, the contents of the newly loaded memory are rapidly read out to the preview display, while the next selected low resolution portion of the sensor image is being written into the memory the contents of which were previously read out and displayed. This clock-addressing multiplexing of the reduced resolution data from the high resolution sensor not only affords rapid display of a selected low resolution portion of the photoprint image, but permits displaying the contents of the high resolution sensor image in a variety of formats for optimizing the manner in which the imaged photoprint may be digitized and stored.

BRIEF DESCRIPTION OF THE DRAWINGS

FIG. 1 is an exterior perspective view, while FIGS. 2 and 3 are diagrammatic respective front and side views of the internal architecture of a dual imaging station, photoprint digitizing scanner described in the above-referenced Parulski et al application, entitled "Dual Imaging Station Scanner;"

FIG. 7 shows a reduced spatial resolution version of the overall image captured by a CCD image sensor for a FRAME mode of operation of the previewer framestore apparatus;

FIG. 8 shows a generally centrally located portion of the overall image captured by a CCD image sensor for a FOCUS mode of operation of the previewer framestore apparatus;

FIG. 9 shows four selected corner portions of an image captured by a CCD sensor for a CORNER MODE of operation of the previewer framestore apparatus; and FIG. 10 shows a mirrored version of an image obtained by switching the address counters from a counting up mode to a counting down mode, when reading out an image.

DETAILED DESCRIPTION

Figure 1:
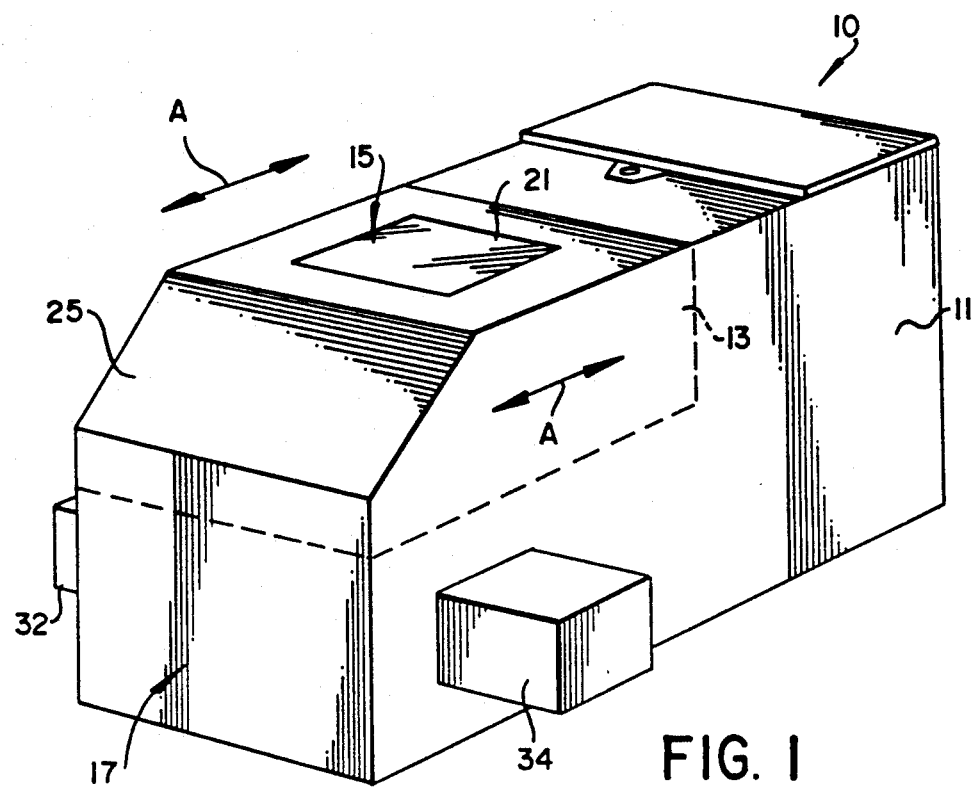
Figure 3:
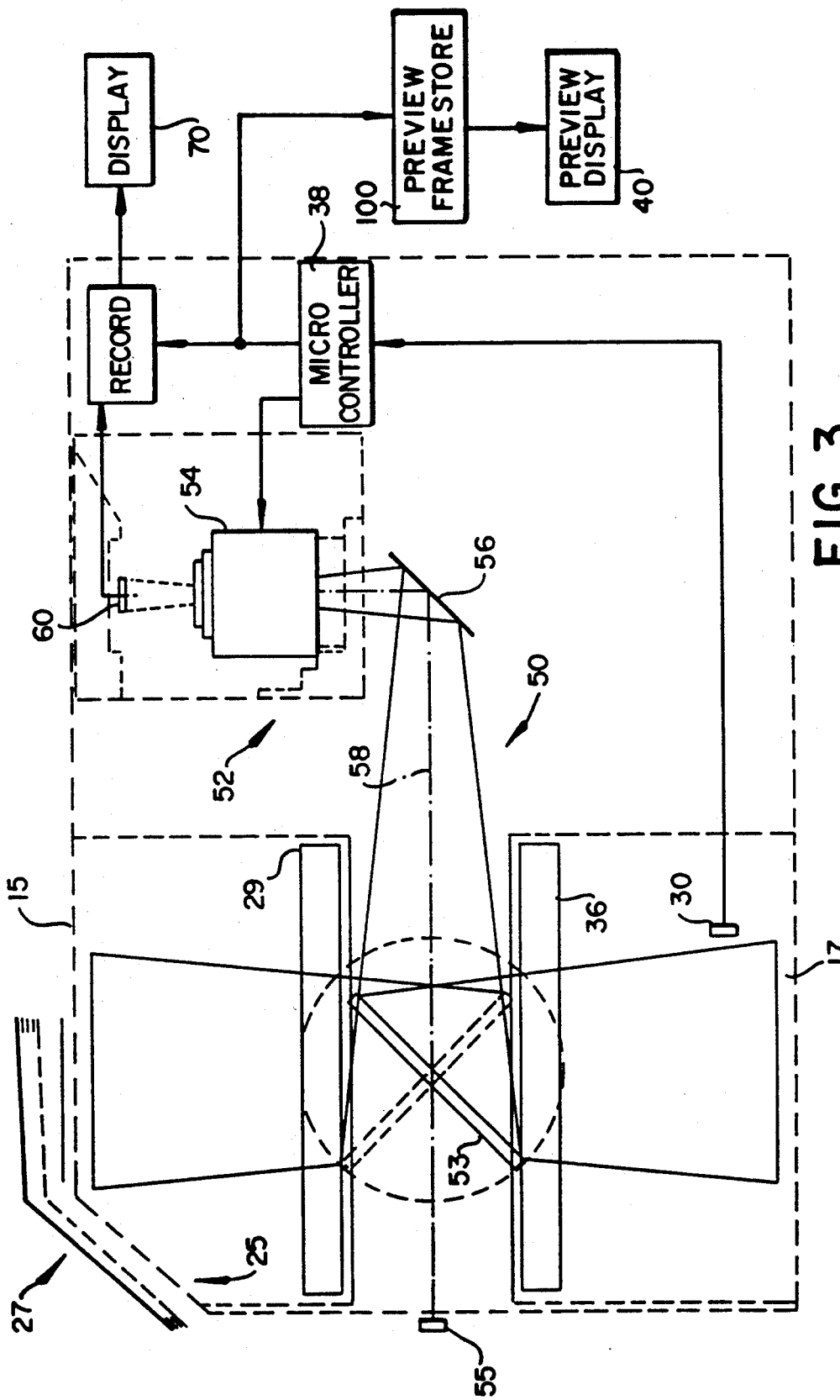

FIG. 1 is an exterior perspective view, while FIGS. 2 and 3 are diagrammatic respective front and side views of the internal architecture of a dual imaging station, photoprint digitizing scanner described in the above-referenced Parulski et al application, entitled "Dual Imaging Station Scanner." The scanner, which is shown generally at 10, preferably comprises a housing or cabinet 11, having an upper, horizontally translatable unit 13, which supports a large area imaging station 15 for viewing an individual photoprint either by itself or retained on a page of a photo album or the like. Beneath unit 13 (and upper imaging station 15) is a lower, magazine-fed platen imaging station 17. Translatable unit 13 is supported for back and forth horizontal movement (or translation) in the direction of arrows A, either manually or by a drive motor (not shown), for the purpose of bringing a desired portion of imaging station 15 into optimum registration with viewing optics through which a photoprint is imaged onto a downstream optoelectronic image sensor.

The upper imaging station 15 comprises a transparent (e.g. glass) plate 21 upon which an individual sheet of photographic recording material, such as a photoprint, 23 may be placed in a face-down condition. Adjacent to top plate 21, translatable unit 13 has a sloped support surface 25, thereby providing, in cooperation with top plate 21, a broad area surface for supporting a large item, such as a photo album (shown diagrammatically in broken lines 27 in its open, face-down condition), so that a page of the photo album may be easily placed in direct imaging-abutment with top plate 21. A first imaging station illuminator 29 comprised of a rectangular configuration of a set of four fluorescent lamps is located beneath top plate 21, so as to provide effectively even illumination of a sheet or page of recording material that is placed face down on the top plate.

A lower portion of cabinet 11 retains a platen feed mechanism 31, which is operative to withdraw and translate a photographic print support platen from a first platen supply magazine 32 to a platen imaging station 17, and then feed the platen from the platen imaging station to a second take up platen storage magazine 34. An individual platen is preferably of a type detailed in the previously referenced co-pending patent application entitled "Photoprint Retaining Platen For Digitizing Image Scanner."

Figure 4:
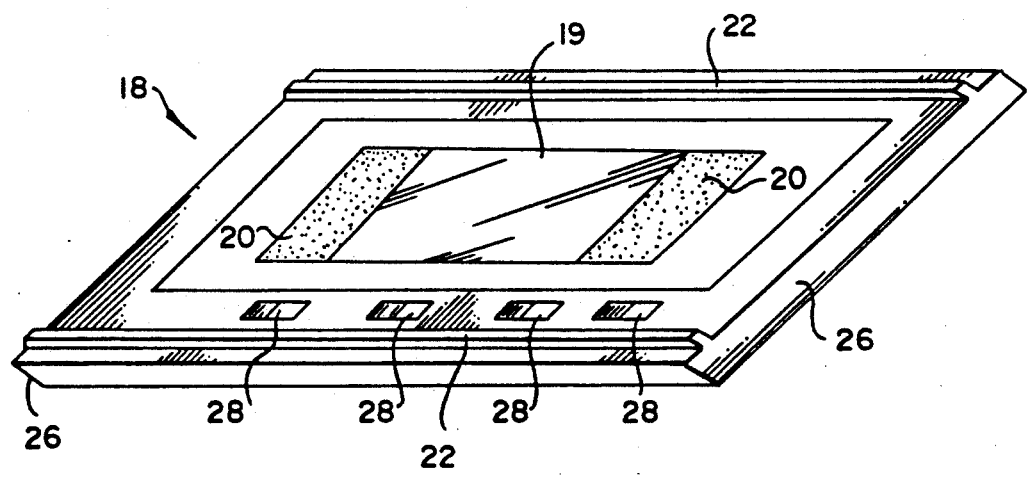
FIG. 4 is a diagrammatic illustration of the configuration of a photoprint-support platen as described in the above identified Parulski et al application, entitled "Photoprint Retaining Platen For Digitizing Image Scanner;"

A photoprint-support platen as described in that application may be generally configured as diagrammatically illustrated at 18 in FIG. 4, in order to facilitate presentation of a photoprint to an imaging station of a photoprint imaging scanner, in a secure protected condition, while also allowing a plurality of photoprint platens to be arranged in a stacked configuration and fed one at the time to a platen imaging station, and then fed from the platen imaging station to a take up location. Preferably, a photoprint support-platen includes a photoprint-retention or mounting surface area 19 which contains a semi-tacky material 20 for removably securing a photoprint to the platen, so that the platen may be reused with other photoprints. Adjacent to the mounting surface area are side rails 22 and the ends 26 of the platen are sloped or beveled to facilitate interleaving of multiple platens in a stack, without the mounted photoprints being contacted by an adjacent platen. One or more image parameter regions 28 are located adjacent to a photoprint mounting surface area for storing machine readable photoprint parameter information (e.g. bar codes or adjustable indicator elements). This machine readable information is detected by one or more image parameter sensors 30 located in the feed path of platen imaging station 17. The outputs of these sensors are coupled to a microcontroller 38, such as an Intel 80C196KB microcontroller which controls the operation of the scanner, including the imaging optics, to rapidly project and focus the image on the photoprint onto an opto-electronic image sensor (e.g. a high resolution CCD image sensor) 60.

The platen feed mechanism comprises a set of controllably driven pinch rollers 41 located between magazine 32 and platen imaging station 17, and a set of controllably driven pinch rollers 43 located between platen imaging station 17 and magazine 34. A controllably stepped drive motor 45 is coupled to rollers 41 and 43 by means of a conventional pulley/drive belt arrangement, not shown, and is controllably driven by the system microcontroller to rotate the pinch rollers and thereby sequentially extract a platen from a bottom slot 33 of supply magazine 32, translate an extracted platen to imaging station 17 and then translate the platen from imaging station 17 to a lower entry slot 35 of take up storage magazine 34. A second imaging station illuminator 36 comprised of a rectangular configuration of a set of four fluorescent lamps, similar to that of illuminator 29 for the first imaging station 15, is located directly above platen imaging station 17, so as to provide effectively even illumination of an individual photoprint carried by a platen that has been transported to imaging station 17.

Supported within housing 11 between upper and lower imaging stations 15 and 17 is a multi-directional image projection mechanism 50. Image projection mechanism 50 is operable to selectively project the image of a photoprint at a selected one of imaging stations 15, 17 onto an opto-electronic image sensor 60, such as a high resolution CCD sensor, the (1536×1024) pixel array of which is electronically scanned and digitized to obtain a digitized image, which is stored in an attendant framestore for subsequent processing. Because the sizes of photoprints may vary (typically 3R, 4R and 5R sized prints) image projection mechanism 50 includes a magnification/focussing unit 52, preferably an adjustable focus zoom lens 54, so that the photoprint image that is projected on the high resolution sensor 60 may be adjusted, as necessary, to ensure that the digitized image that is written onto a compact disc and played back on a customer's home CD player will be correctly displayed, in focus and filling the screen of a customer's television set.

As described previously, image projection mechanism 50 includes an adjustable magnification/focussing unit 52 that preferably contains an adjustable focus zoom lens 54, such as a Nikon 35-70 mm zoom lens. Zoom lens 54 is preferably fitted with magnification and focus adjustment rings in the form of toothed collars, which are mounted so that, as they are rotated, they are translated along an image projection axis which intersects (and is normal to) the plane of the scanner's high resolution CCD sensor 60. Each lens collar is coupled either directly or through a suitable linkage to a respective stepper motor. The gear ratio and stepper motor resolution are such as to allow fine angular motion of the zoom lens so as to permit fine adjustments in both its magnification and focus settings. In addition, respective 'home' or 'reset' position sensors are arranged along the travel path of the lens collars for detecting when the collars have reached prescribed reference positions. The stepper motors are controllably driven by associated motor controllers under the control of microcontroller 38, in response to either operator-sourced inputs or platen-sourced parameter data, so as to control the size and position of the photoprint image that is projected and focussed on high resolution CCD sensor 60. The scanning system also preferable includes control components for a shutter and an associated filter wheel which control the amount of light and color components of photoprint images projected onto sensor 60, as described in co-pending U.S. patent application Ser. No. 07/762,323, filed Sep. 16, 1991 entitled "Color Sequential Scanner Incorporating A Synchronized Variable Exposure Shutter" by K. A. Parulski et al, assigned to the assignee of the present application and the disclosure of which is herein incorporated.

As described in that application, advantage is taken of the improved color balance properties of fluorescent lamps, by synchronizing the exposure time of an electronic shutter (through which respective red, blue and green color images of a photoprint are sequentially captured by high resolution optoelectronic image sensor 60) with the AC power source for the lamps. Using a high resolution image sensor, such as a 1536×1024 pixel CCD image sensor for image sensor 60, and effecting a two dimensional translation or dither of the image sensor relative to the projected image, makes it possible to realize a 3072×2048 pixel (high resolution) image corresponding to that obtained by the image pixel matrix of a high resolution color camera. Such a relative dither may be accomplished by either physically translating the image sensor itself or by translating the projected image.

In accordance with a preferred embodiment of the scanner, the projected image is 'dithered' in the X and Y directions on the image plane of CCD sensor 60 by means of an image dither mechanism in the form of a canted glass plate, which is inserted in the image projection path ahead of sensor 60 and sequentially rotated in ninety degree segments so as to cause successively projected images to fall on (four) respectively adjacent regions of the sensor. Capturing and digitizing the image that falls on each of these adjacent regions makes it possible to realize a 3072×2048 high resolution image output from the CCD image sensor.

For each respective monochromatic image (one or red, green and blue) as determined by a sequentially stepped color filter wheel, the output of image sensor 60 is digitized and stored in an associated image framestore of host processor/microcontroller 38. The stored digitized image is then processed by the host image processor for storage on a digital storage medium, such as a compact disc, which may then be delivered to the customer for playback by a CD player and display on a home television set.

A multicolor filter wheel is controllably rotated by a motor controller to sequentially insert a respective one of successive red, green and blue filters in the path of the projected image, while the operation of a shutter is controlled by a shutter controller to define the length of time that the photoprint is imaged on sensor 60. Like the zoom stepper motor and the focus stepper motor, the filter wheel motor has an associated home or reset sensor which established a reference or reset position for the filter. As a non-limitative example, the filter wheel may have a home position such that its green filter is disposed in the path of the projected image. This home color is used during the monochrome preview display of the photoprint image.

The photoprint image that is focussed on high resolution CCD sensor 60 is read out through a sensor interface to microcontroller 38 and to a 'preview' framestore 100 connected to a 'preview' display monitor 40. By observing 'preview' display 40, the photofinisher is able to adjust as necessary, via a set of control buttons on a control panel, the control parameters of image magnification/focussing unit 52, until the previewed image is optimally focussed and geometrically positioned on the display screen. When the photofinisher is satisfied that the image is properly displayed, he may depress a 'program' button, which causes the magnification and focus settings for a selected print size to be stored in a default table, so that the control parameters for the zoom lens will be effectively calibrated to that photoprint. Thereafter, for subsequently fed platen-mounted photoprints, the operation of the image magnification-focussing unit is referenced automatically to the newly calibrated default settings, thereby facilitating rapid scanning of a series of platen-mounted photoprints.

As noted earlier, in order to enable the photofinisher to optimally adjust the projection and focussing parameters of the scanner, such as any required translation of unit 13 and adjustment of zoom lens 54, the output of high resolution CCD image sensor 60 is coupled separately of the high resolution image processing workstation to an auxiliary, lower resolution, monochromatic 'preview' display unit 40. While it is possible to use the high resolution color display terminal of the photofinishing workstation for this purpose, from a practical operational standpoint, the processing time required to display the full color 3072 × 2048 pixel image is prohibitive. For successful operation of the scanner, its projected image must be correctly sized and focussed on the image sensor. To satisfy these requirements, during a 'preview' of the image, the photofinisher views a reduced resolution monochromatic image.

Figure 5:
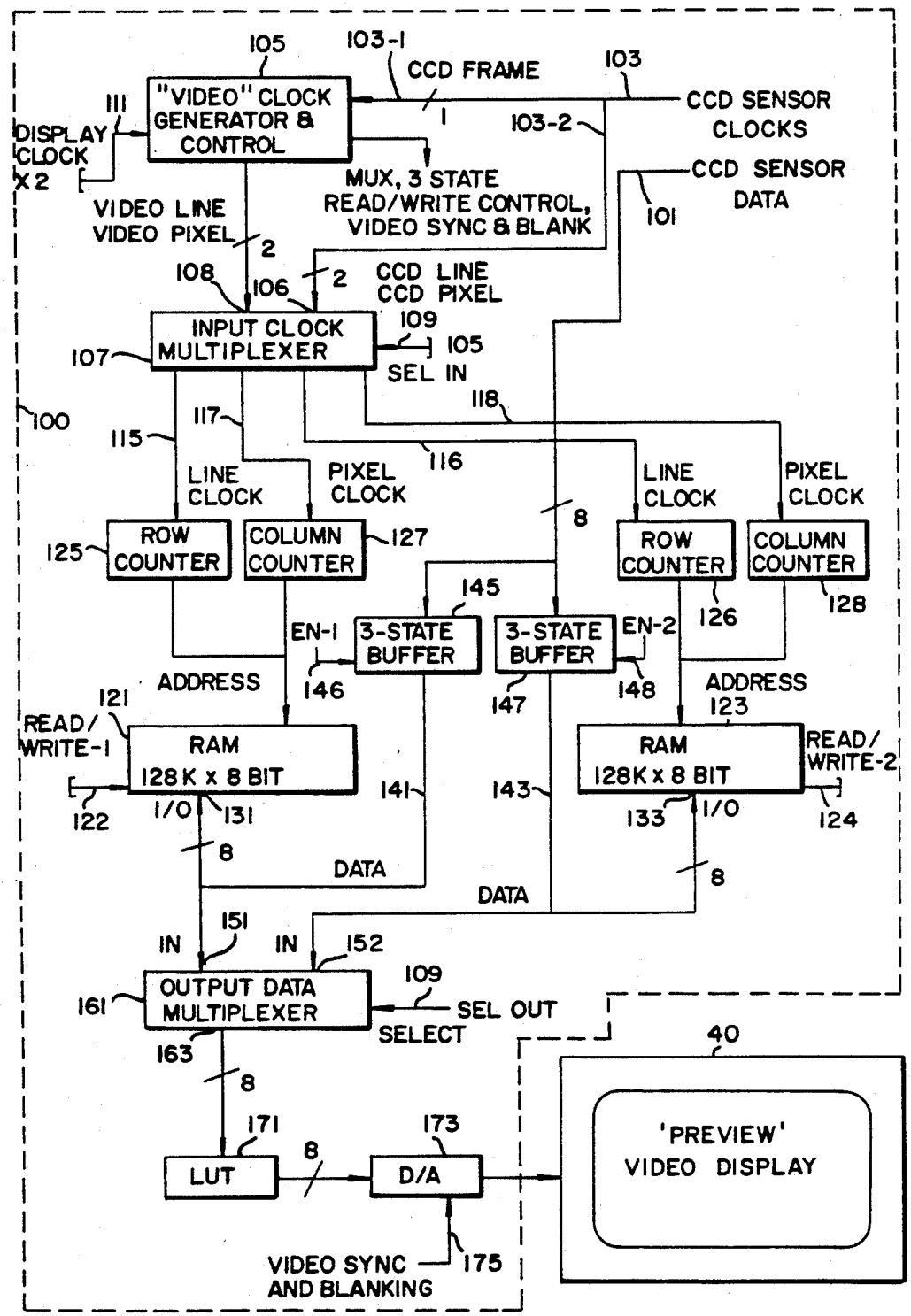
FIG. 5 diagrammatically illustrates an auxiliary previewer framestore apparatus in accordance with the present invention.

In accordance with the present invention, in order to enable the photofinisher to rapidly view what is seen by the CCD image sensor 60 on display 40, the sensor output interface preferably includes an auxiliary previewer framestore apparatus 100 diagrammatically illustrated in FIG. 5. As shown therein, the previewer framestore includes a first input port 101 which is coupled to receive digital data signals that have been derived from the scanning of the respective pixels of the (1536 × 1024 pixel) array of high resolution CCD sensor 60. The timing/framing signals that are is used to control the scanning of CCD array 60 are coupled via a clock link 103 to a video clock generator and control unit 105 and to a first input 106 of an address multiplexer 107. A first (single bit wide) portion 103-1 of clock link 103 supplies an image frame timing signal (CCD__Frame) to unit 105 to indicate the completion of the clocking out of a frame of imagery data from the sensor. A second (two bit wide) portion 103-2 of link 103 supplies respective line and pixel clocking signals CCD__Line and CCD__Pixel for controlling the generation of address sginals for reading in imagery data to a selected one of ping-pong memories 121, 123.

Control unit 105 is comprised of flip-flips and associated timing logic circuitry driven by a local clock source (e.g. a 28 MHz clock) via line 111 for supplying timing signals for the frame store. For this purpose control unit 105 may comprise a Kodak EBS-1 unit manufactured by the assignee of the present application and described in the publication by M. D. Brown et al, entitled "The EBS-1, An EPROM-based Sequencer ASIC," IEEE Custom Integrated Circuits Conf., CICC '88 Proceedings, pp 15.6.1-15.6.4, May 1988. Control unit 105 has a (two bit wide) output clock link 113 which is coupled to a second input port 108 of multiplexer 107 and supplies respective line and pixel clock signals Video__Line and Video__Pixel for controlling the generation of address signals for reading out imagery data from a selected one of ping-pong memories 121, 123 for application to preview video display unit 40. For the parameters of the present embodiment, each of memories 121, 123 may comprise a 8 bit × 128 K static RAM chip, such as an Hitachi HM628128 chip. Control unit 105 also supplies video sync and blanking signals, multiplexer select control signals, memory read/write signals and three-state buffer enable signals, via control link 109.

Address clock multiplexer 107 has a first pair of output lines 115, 117 which are coupled to respective row and column counters 125, 127, the contents of which are used to define the row and column addresses of imagery data memory 121. Similarly, address clock multiplexer 107 has a second pair of output lines 116, 118 which are coupled to respective row and column counters 126, 128, the contents of which are used to define the row and column addresses of imagery data memory 123. The data port 131 of memory 121 is coupled to (eight bit wide) data link 141, which is coupled to tri-state buffer 145 and to a first input port 151 of an output data multiplexer 161. The data port 133 of memory 123 is coupled to (eight bit wide) data link 143, which is coupled to tri-state buffer 147 and to a second input port 152 of an output data multiplexer 161. Each of tri- state buffers 145, 147 is coupled to supply buffered imagery data from CCD sensor 60 supplied via link 101 to data links 141, 143 when enabled by enable lines 146, 148.

In response to a select signal Sel__Out on link 109 from control unit 105, output data multiplexer 161 selectively couples one of data links 141, 143 to its output data port 163, while three-state buffers 145, 147 couple CCD sensor data 101 to the alternate data link 143, 141 (i.e. the data link not selected by multiplexer 161). The imagery data at output port 163 is appropriately translated to conform with the operational parameters of video display 40 via a gamma correction look-up table 171 and supplied to digital-to-analog converter 173 along with video sync and blanking signals 175 supplied by control unit 105 for application to previewer video display unit 40. For a conventional monochrome CRT display having a 4:3 aspect ratio, the necessary number of top and bottom lines of the display are blanked to accommodate the 3:2 aspect ratio image. To eliminate interline flicker, progressive scan readout of the 256 line image is employed.

In operation, memories 121, 123 are driven in a write/read 'ping/pong' fashion, so that as data from a selected portion of sensor 60 is being written into one memory at the clock rate of the CCD scanning clock on link 103-2, data from the other memory is read out and applied to previewer display at the clock rate of video clock on video clock link 108.

Figure 6B:
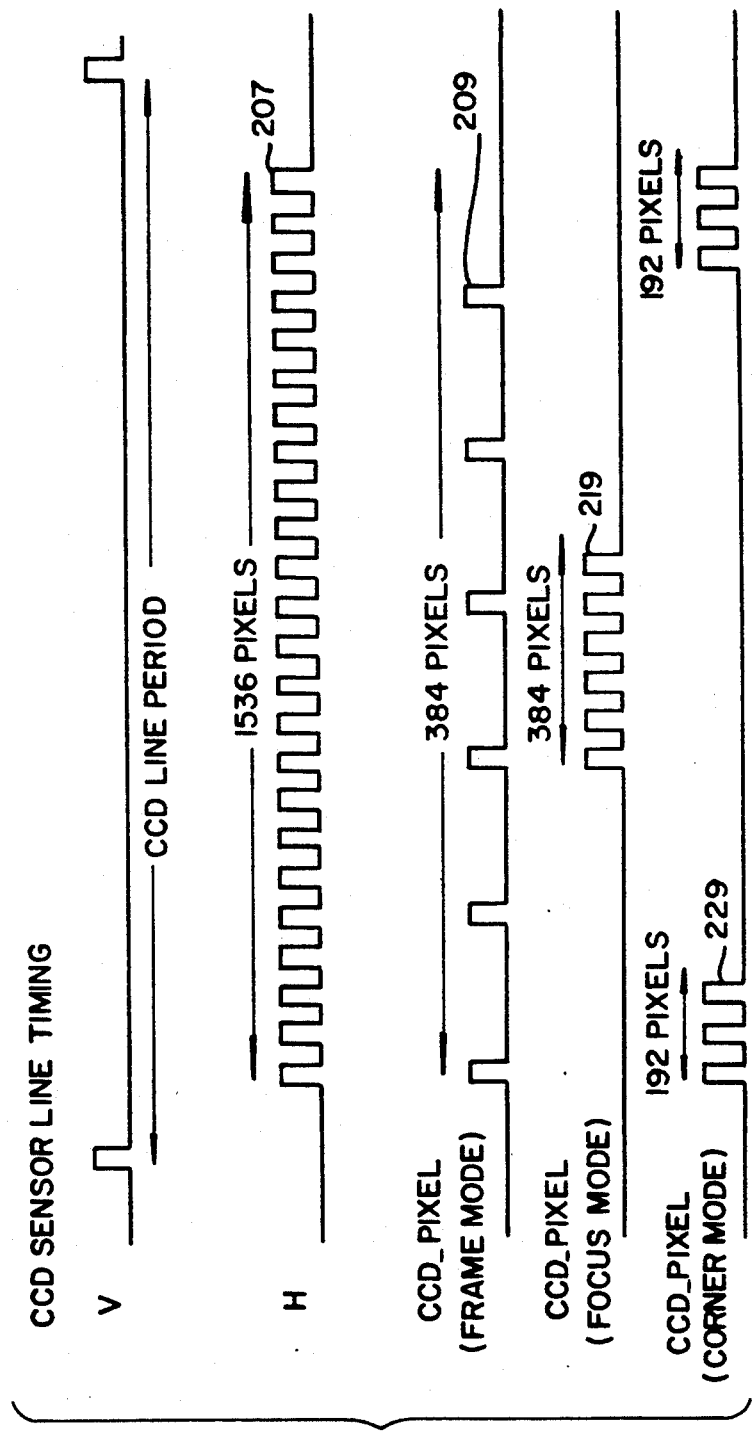
FIG. 6 diagrammatically show sets of timing signals used in the operation of the framestore for three different modes of operation (FRAME, FOCUS, CORNER)

More particularly, with reference to the timing diagrams of FIG. 6 which diagrammatically show sets of timing signals used in the operation of the framestore for three different modes of operation (FRAME, FOCUS, CORNER), the exposure time of CCD sensor 60 to a projected image is defined by a shutter signal 201. At the termination of the shutter signal, the 1536 columns × 1024 lines of pixels of the sensor array are scanned by a scanner clocking signal and, via a quantizer coupled to the scanner output, the digitized contents of the clocked pixels are coupled via data line 101 to tri-state buffers 145, 147, while the clock signals employed to effect the scanning of the scanner's pixel array are coupled over link 103. As pointed out previously, depending upon the mode of operation selected (FRAME, FOCUS, CORNER), the format of the clock signals will vary so as to delineate a selected portion of the contents of the scanner's pixel array.

CLOCKING FORMAT

Frame Mode

For FRAME MODE operation, a reduced spatial resolution version of the overall image captured by scanner 60 is to be displayed to the photofinisher, as shown in FIG. 7, in order to aid in framing the image. The reduction is such as to down-convert the 1536×1024 high resolution image derived by the high resolution CCD sensor to a 384×256 low resolution version of the entire image that can be readily accommodated by the pixel array resolution of a conventional low resolution monochrome display monitor.

For this purpose the sensor scanning clock is subdivided to clock every fourth pixel and every fourth line of the array. Thus, a clock signal that would normally clock each of the 1024 lines of the array, as shown at 203 in FIG. 6, is subdivided to a clock format shown at 205, which clocks every fourth line, so that a total of 256 lines of the sensor array are clocked.

Similarly, the clock signal that would normally clock each of the 1536 pixels of an individual line, as shown at 207, is subdivided to a clock format shown at 209, which clocks every fourth pixel, so that a total of 384 pixels per line are clocked.

Focus Mode

For the FOCUS MODE of operation, only a generally centrally located portion of the overall image captured by scanner 60 is displayed to the photofinisher, as shown in FIG. 8, in order to aid in focussing the scanner. The size of this centrally located portion or 'focusing window' 210 of the image contains the same number of pixels as the 384×256 low resolution image extracted for FRAME mode of operation, with all of the pixels within the 'focussing window' being clocked. Thus, in the FOCUS mode there is also a spatial reduction which is such as to crop the 1536×1024 high resolution image to a 384×256 version of the center portion of the image.

In FOCUS mode, the format of the sensor scanning clock is such that only lines 384–640 are clocked, as shown at 215 and, within these lines, only pixels 574–958 are clocked, as shown at 219.

Corner Mode

For CORNER MODE operation, four selected portions of the image—the upper left, upper right, lower left and lower right portions of the overall image captured by scanner 60, are displayed to the photofinisher as a combined 384×256 image, as shown in FIG. 9 to aid in precise framing. To convert the 1536×1024 high resolution image to a 384×256 low resolution version of the image, the format of the sensor scanning clock is such that groups or sets of 192×128 pixels at the respective corners of the scanner array are clocked. Thus, the upper and lower 128 lines of the array will be clocked as shown at 225, and within these lines the first 192 and the last 192 pixels will be clocked, as shown at 229.

Multiplexed Clock Addressing

As pointed out above, the addressing of memories 121 and 122 is controlled in accordance with the count values of line (row) and pixel (column) clock counters 125, 127 and 126, 128, respectively. When imagery data is to be written into memory, for example memory 121, clock signals formatted in accordance with the selected mode of operation are coupled over line 103 and directed by multiplexer 107 to one of the pairs of row and column address clock counters. For purposes of illustration, let it be assumed that the FRAME mode of operation has been selected, so that the line and pixel colock signals formatted as shown at 205 and 209 in FIG. 6 are coupled over link 103-2 to input port 106 of input clock multiplexer 107. the select link 109 from control unit 105 steers the clock signals to multiplexer output lines 115, 117 for application to row and column counters 125, 127. As imagery data is clocked out of the sensor array and presented to data link 101 associated line and pixel clock signals for the array pixels cause the successive incrementing of the address clock counters for memory 121, so that the data coupled via tri-state buffer 145 and applied to link 141 is written into successive locations in memory 121 via data I/O port 131, while memory 121 is placed in write mode via read/write-1 line 122.

At the conclusion of the frame, a CCD-FRAME signal, shown at 171, is coupled via link 103-1 to control unit 105. In response to this signal, the control unit waits until the last line of the image stored in memory 123 is read out to preview display 40, (i.e. until the vertical blanking period beings) and then switches the state of the select input to output data multiplexer 161 to enable its contents to be clocked out for display by preview display unit 40. For this purpose the select input to input clock multiplexer 107 is also switched, so that video clock signals on link 108 are steered via multiplexer 107 to row and column counters 125, 127. The state of memory 121 is placed in the read out mode so the contents of its memory locations addressed by counters 125, 127 are placed on data link 141 and applied to input port 151 of output data multiplexer 161, which couples the read out data to its output port 163 for display.

Since the select input to input clock multiplexer 107 is switched, the sensor pixel and line clock signals on link 103-2 and applied at input port 106 of input clock multiplexer 107 are now steered via its output links 116, 118, so that line and pixel clock signals shown at 205 and 209 in FIG. 6 are now coupled to row and column counters 126, 128. The state of memory 123 is now placed in the write in mode, via read/write-2 line 124, so that the contents of its memory locations addressed by counters 126, 128 are loaded with CCD sensor data that has been coupled via tri-state buffer unit 147 onto data link 143 and applied to data I/O port 133 of memory 123. Thus, at the same time that the first FRAME mode image frame data is being clocked out of memory 121, a new frame of (FRAME MODE) data (which may correspond to a slightly different image on sensor 60 as a result of the operator translation of unit 13 or adjustment of zoom lens 54) is being written into memory 122. At the completion of the writing in of this second FRAME mode image data, the select inputs to the multiplexers are switched so that the pixel data stored from the second FRAME mode image is read out and displayed.

Typically, following the FRAME mode, the photofinisher may select the FOCUS mode of operation, so that line and pixel clock signals shown at 215 and 219 in FIG. 6 are coupled to row and column counters 126, 128. The state of memory 123 is now placed in the write in mode, so that the contents of its memory locations addressed by counters 126, 128 are loaded with CCD sensor data that has been coupled via tri-state buffer unit 147 onto data link 143 and applied to data I/O port 133 of memory 123. Thus, at the same time that FRAME mode data is being clocked out of memory 121, a new frame of (FOCUS MODE) data is being written into memory 122. At the completion of the writing in of the FOCUS mode data, the select inputs to the multiplexers are switched so that the pixel data located within the 'focusing window' is read out and displayed.

This alternate 'ping-ponging' of memories 121, 123 in accordance with the clock signals used to access selected portions of the 1536×1024 pixel array of CCD sensor effectively accomplishes a direct addressing of the memories for writing in a reduced resolution version of the sensor image, while permitting the reduced resolution image, once loaded, to be rapidly read out and displayed.

Because addressing of the ping-pong memories is accomplished by means of counters, it is possible to produce 'mirrored' versions of processed images, either vertically or horizontally, simply by changing the direction of the counting operation of the counters during readout, via up/down input lines (not shown) supplied by timing control unit 105 to counters 125–128. Namely, by switching the address counters from a counting up mode to a counting down mode, when reading out an image, the read out image will be displayed as a mirrored version of the input image, either vertically or horizontally depending upon which counters are reversed, as shown in FIG. 10. This allows the memory to compensate for images which have been placed in reverse orientation on image stations 15 or 17.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a digital data signal processing apparatus having an input port coupled to receive digital data signals controllably supplied thereto in accordance with first clock signals, and an output port to which selected ones of said digital data signals are controllably supplied in accordance with second clock signals, an arrangement for controllably interfacing digital data signals coupled to said input port to said output port comprising:
   first and second digital data memory regions, storage locations in each of which are selectively addressable;
   a first clock signal steering circuit which is operational to controllably address said first digital data memory region in accordance with selected ones of said first clock signals, and cause a first portion of said digital data signals to be written into storage locations of said first memory region addressed in accordance with said first clock signals; and
   a second clock steering circuit which is operative to controllably address said second digital data memory region in accordance with said second clock signals and cause digital data signals stored therein to be read out and coupled to said output port.

2. An arrangement according to claim 1, wherein said first clock signal steering circuit, in response to the completion of the storing of said first portion of said digital data signals into said first digital data memory, is operative to controllably address said second digital data memory region in accordance with selected others of said first clock signals and cause a second portion of said digital data signals to be written into storage locations of said second memory region addressed in accordance with said second clock signals, and wherein said second clock signal steering circuit in response to the completion of the storing of said first portion of said digital data signals into said second digital data memory, is operative to controllably address said first digital data memory region in accordance with said second clock signals and cause data signals stored therein to be read out and coupled to said output port.

3. An arrangement according to claim 1, wherein said first clock signal steering circuit comprises a first set of column and row address counters associated with said first memory region and a second set of column and row address counters associated with said second memory region, the count value contents of a respective counter identifying a respective row or address of a storage location of an associated memory region, and wherein said first clock signals contain first and second components which are coupled by said first clock signal steering circuit to respective column and row counters of a selected one of said first and second sets of column and row counters.

4. An arrangement according to claim 3, wherein said second clock steering circuit includes said first set of column and row address counters associated with said first memory region and said second set of column and row address counters associated with said second memory region, the count value contents of a respective counter identifying a respective row or address of a storage location of an associated memory region, and wherein said second clock signals contain respective column and row associated components which are coupled by said second clock signal steering circuit to respective column and row counters of a selected one of said first and second sets of column and row counters.

5. An arrangement according to claim 4, wherein said second clock steering circuit is operative to effect a down counting operation of at least one of said column and row counters, so as to effect a read out and display of a mirrored version of an image.

6. An arrangement according to claim 1, wherein said first clock signal steering circuit, in response to the completion of the storing of said first portion of said digital data signals into said first digital data memory, is operative to controllably address said second digital data memory region in accordance with selected others of said first clock signals and cause a second portion of said digital data signals to be written into storage locations of said second memory region addressed in accordance with said second clock signals, and wherein said second clock signal steering circuit in response to the completion of the storing of said first portion of said digital data signals into said second digital data memory, is operative to controllably address said first digital data memory region in accordance with said second clock signals and cause data signals stored therein to be read out and coupled to said output port.

7. An arrangement according to claim 1, wherein said digital data signal apparatus comprises an imagery data storage and retrieval apparatus having an input port coupled to an imagery data link which outputs digital data signals representative of the response of respective locations of an array of image detector cells to an image incident thereon, and wherein said first portion of said digital data signals is representative of the outputs of a portion of said array of image detector cells.

8. An arrangement according to claim 7, wherein said portion of said array of image detector cells corresponds to a two-dimensional sub-array of said image detector cells.

9. An arrangement according to claim 7, wherein said portion of said array of image detector cells is associated with corner regions of said array.

10. An arrangement according to claim 7, wherein said portion of said array of image detector cells is associated with a generally centrally located region of said array.

11. An arrangement according to claim 1, wherein said digital data signal apparatus comprises an imagery data storage and retrieval apparatus having an input port coupled to an imagery data link which outputs digital data signals representative of the response of respective locations of an array of image detector cells to an image incident thereon, and wherein said first portion of said digital data signals is representative of the outputs of a portion of said array of image detector cells.

12. An arrangement according to claim 3, wherein the count limits of the row and address counters of a respective set are defined in accordance with the number of detector cells of said portion of said array of image detector cells.

13. An arrangement according to claim 12, wherein the count limits of the row and address counters of a respective set are defined such that the product of said count limits corresponds to the number of detector cells of said portion of said array of image detector cells.

14. An arrangement according to claim 7, wherein said output port is coupled to supply imagery data signals for a video display device.

15. For use with an apparatus for digitizing an image that has been recorded on a photographic recording medium and storing the digitized image on a digital storage medium, said apparatus including an image projection device and a photo-responsive device upon which an image on said photographic recording medium is projected by said image projection device, said photo-responsive device providing output signals representative of the image projected thereon, said output signals being digitized for storage on said digital storage medium, said apparatus further including a display device to which output signals provided by said photo-responsive device are coupled so as to display the projected image, a method of controlling the manner in which an image on said photographic recording medium is displayed by said display device comprising the steps of:

(a) providing first and second storage devices which are capable of storing imagery representative signals clocked out of said photoresponsive device;

(b) generating a first clock signal for clocking the output of said photoresponsive device, said first clock signal having a format which defines a first selected portion of the image received by said photoresponsive device, said first clock signal being controllably coupled to address memory locations in a first of said plurality of storage devices, whereby imagery representative signals associated with a first selected portion of the image received by said photoresponsive device may be stored in said first storage device;

(c) generating a second clock signal for clocking the output of said photoresponsive device, said second clock signal having a format which defines a second selected portion of the image received by said photoresponsive device, said second clock signal being controllably coupled to address memory locations in a second of said plurality of storage devices, whereby imagery representative signals associated with said second selected portion of the image received by said photoresponsive device may be stored in said second storage device; and (d) controllably reading out the contents of said first storage device for application to said display device, and thereby enabling said display device to display said first selected portion of said image, while controllably coupling said second clock signal to address memory locations of said second storage device and causing imagery representative signals associated with said second selected portion of said image to be stored in said second storage device.

16. A method according to claim 15, further including the step of:

(e) controllably reading out the contents of said second storage device for application to said display device, and thereby enabling said display device to display said second selected portion of said image, while controllably coupling said first clock signal to address memory locations of said first storage device and causing imagery representative signals associated with said first selected portion of said image to be stored in said first storage device.

17. For use with an apparatus for controlling the projection of an image that has been recorded on a photographic recording medium onto a photoresponsive device, said photo-responsive device providing, in accordance with clock signals, data signals representative of the image projected thereon, said apparatus including a controllable magnification, image projection device which is operative to controllably project an image on said photographic recording medium onto said photoresponsive device, a projection device controller which is operative to control the operation of said image projection device so as to cause said image projection device to project an image on said photographic recording medium onto said photo-responsive device in accordance with information representative of the size of said image as recorded on said photographic recording medium, said projection device controller being operative to adjust, as necessary, the operation of said image projection device so that the image displayed by said image display device has a prescribed size, and a storage device which is controllably operative to store information representative of the adjustment of the operation of said image projection device, said projection device controller being coupled to said storage device to access therefrom, for subsequent presentations of photographic recording media to said apparatus, adjustment information stored in said storage device, and to control the operation of said projection device in accordance with said accessed adjustment information, an arrangement for causing a selected portion of the image represented by output signals from said photo-responsive device to be coupled to a display device for display of the projected image, comprising:

first and second digital data memories, storage locations in each of which are selectively addressable;

a first clock signal steering circuit which is operational to controllably address said first digital data memory in accordance with first selected ones of said clock signals, and cause a first portion of said digital data signals to be written into storage locations of said first memory addressed in accordance with said first selected ones of said clock signals; and a second clock steering circuit which is operative to controllably address said second digital data memory in accordance with read out clock signals and cause digital data signals stored therein to be read out and coupled to said display device.

18. An arrangement according to claim 17, wherein said first clock signal steering circuit, in response to the completion of the storing of said first portion of said digital data signals into said first digital data memory, is operative to controllably address said second digital data memory region in accordance with second selected ones of said clock signals and cause a second portion of said digital data signals to be written into storage locations of said second memory region addressed in accordance with said second selected ones of said clock signals, and wherein said second clock signal steering circuit, in response to the completion of the storing of said first portion of said digital data signals into said second digital data memory, is operative to controllably address said first digital data memory region in accordance with said read out clock signals and cause data signals stored therein to be read out and coupled to said display device.

19. An arrangement according to claim 17, wherein said first clock signal steering circuit comprises a first set of column and row address counters associated with said first memory and a second set of column and row address counters associated with said second memory, the count value contents of a respective counter identifying a respective row or address of a storage location of an associated memory, and wherein said clock signals contain first and second components which are coupled by said first clock signal steering circuit to respective column and row counters of a selected one of said first and second sets of column and row counters.

20. An arrangement according to claim 17, wherein said first clock signal steering circuit, in response to the completion of the storing of said first portion of said digital data signals into said first digital data memory, is operative to controllably address said second digital data memory region in accordance with second selected ones of said clock signals and cause a second portion of said digital data signals to be written into storage locations of said second memory addressed in accordance with said second selected ones of said clock signals, and wherein said second clock signal steering circuit in response to the completion of the storing of said second portion of said digital data signals into said second digital data memory, is operative to controllably address said first digital data memory in accordance with said read out clock signals and cause data signals stored therein to be read out and coupled to said display device.

21. An arrangement according to claim 15, wherein said first portion of said digital data signals is representative of the imagery contents of a two-dimensional sub-array of said photoresponsive device.

22. An arrangement according to claim 15, wherein said first portion of said digital data signals cells is associated with corner regions of an array of image detection pixels of said photoresponsive device.

23. An arrangement according to claim 15, wherein said first portion of said digital data signals is associated with a generally centrally located region of an array of image detection pixels of said photoresponsive device.

24. An arrangement according to claim 19, wherein the count limits of the row and address counters of a respective set are defined in accordance with the number of detector cells of said first portion of said array of image detection pixels of said photoresponsive device.

25. An arrangement according to claim 24, wherein the count limits of the row and address counters of a respective set are defined such that the product of said count limits corresponds to the number of image detection pixels said first portion of said array of image detection pixels of said photoresponsive device.

26. An arrangement according to claim 15, wherein said image projection device comprises an adjustable focus, zoom lens, and wherein said projection device controller is operative to adjust the operation of said zoom adjustable lens so that the image displayed by said image display device is displayed in focus on said display device and substantially fills the display area of said display.

* * * * *